(12) United States Patent
Scarborough, III (10) Patent No.: US 12,546,399 B2
(45) Date of Patent: *Feb. 10, 2026

(54) TOP-LOADED ROTARY VALVE WITH ELLIPTICAL SEALING

(71) Applicant: Neptune Technology Group LLC, Wilmington, DE (US)

(72) Inventor: John Raymond Scarborough, III, Auburn, AL (US)

(73) Assignee: Neptune Technology Group LLC, Tallassee, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,579

(22) Filed: Jun. 11, 2024

(65) Prior Publication Data

US 2024/0328516 A1 Oct. 3, 2024

Related U.S. Application Data

(63) Continuation of application No. 18/159,866, filed on Jan. 26, 2023, now Pat. No. 12,038,090.

(60) Provisional application No. 63/308,113, filed on Feb. 9, 2022.

(51) Int. Cl.
*F16K 5/18* (2006.01)
*F16K 5/04* (2006.01)

(52) U.S. Cl.
CPC .............. *F16K 5/18* (2013.01); *F16K 5/0407* (2013.01); *F16K 5/184* (2013.01); *F16K 2200/501* (2021.08)

(58) Field of Classification Search
CPC .... F16K 2200/501; F16K 5/0407; F16K 5/18; F16K 5/184; F16K 1/2268
See application file for complete search history.

(56) References Cited

U.S. PATENT DOCUMENTS

| | | | | |
|---|---|---|---|---|
| 147,532 A * | 2/1874 | Van Horn | ............... | F16K 5/184 251/182 |
| 461,206 A * | 10/1891 | Goll | ..................... | F16K 1/2263 251/306 |
| 1,031,642 A * | 7/1912 | Haase | .................. | F16K 27/003 137/271 |
| 1,081,322 A * | 12/1913 | Murphy | ................. | F16K 5/184 251/286 |
| 1,251,453 A * | 12/1917 | Spencer | ............... | F16K 1/2263 261/65 |

(Continued)

*Primary Examiner* — Umashankar Venkatesan
(74) *Attorney, Agent, or Firm* — Fish & Richardson P.C.

(57) ABSTRACT

A top-loaded rotary valve with elliptical sealing is provided. The valve includes a valve cartridge with a lower cylinder portion having a first flow opening, an upper cylinder portion having a second flow opening, a rotor, and a gasket positioned between respective ends of the lower cylinder portion and the upper cylinder portion. The rotor includes a stem and a disc configured to rotate within the cartridge. The lower cylinder portion and the upper cylinder portion are mated to the gasket along a plane that defines an ellipse along the respective cylinder ends. The disc has perimeter that is similar to the ellipse, and the rotor rotates between a closed position in which the elliptical perimeter of the disc is coincident with the gasket to prevent flow between the flow openings and an open position that permits flow between the flow openings.

16 Claims, 7 Drawing Sheets

(56) References Cited

U.S. PATENT DOCUMENTS

| | | | | |
|---|---|---|---|---|
| 1,688,035 A * | 10/1928 | Bryant | F16K 5/184 | 251/177 |
| 2,027,108 A * | 1/1936 | Kuehling | F16K 5/184 | 251/182 |
| 2,075,460 A * | 3/1937 | Parker | F16K 5/184 | 251/182 |
| RE21,113 E * | 6/1939 | Sproull | F16K 5/184 | 251/164 |
| 2,283,281 A * | 5/1942 | Ohls | F16K 5/184 | 251/163 |
| 2,414,966 A * | 1/1947 | Melichar | F16K 5/184 | 29/890.13 |
| 2,581,047 A * | 1/1952 | Salmond | F16L 27/0849 | 285/184 |
| 2,649,275 A * | 8/1953 | Noyes | F16K 5/184 | 251/297 |
| 2,666,616 A * | 1/1954 | Erieson | F16K 5/184 | 137/246.22 |
| 3,048,191 A * | 8/1962 | Crang | F16K 5/0407 | 251/317 |
| 3,059,897 A * | 10/1962 | Jensen | F16K 1/2261 | 251/308 |
| 3,080,145 A * | 3/1963 | Swain | F16K 1/2263 | 251/364 |
| 3,346,002 A * | 10/1967 | Thompson, Jr. | F16K 5/0471 | 29/890.128 |
| 3,418,411 A * | 12/1968 | Fawkes | F16K 1/2263 | 249/105 |
| 3,567,179 A * | 3/1971 | Radtke | F16K 1/2261 | 277/631 |
| 3,578,287 A * | 5/1971 | Salerno | F16K 1/2261 | 251/306 |
| 4,271,858 A * | 6/1981 | Snape | F16K 17/386 | 251/306 |
| 4,327,765 A * | 5/1982 | Wilson | F16K 1/2268 | 251/306 |
| 4,465,259 A * | 8/1984 | Allen | F16K 27/067 | 251/304 |
| 4,476,891 A * | 10/1984 | Mulas | F16K 27/067 | 251/315.13 |
| 4,518,150 A * | 5/1985 | Greenburg | F16K 1/2263 | 251/306 |
| 4,605,201 A * | 8/1986 | Miyazaki | F16K 1/2265 | 251/305 |
| 4,655,252 A * | 4/1987 | Krumhansl | F16K 11/0853 | 251/59 |
| 5,081,972 A * | 1/1992 | Daly | F16K 1/2261 | 251/306 |
| 5,284,182 A * | 2/1994 | McLennan | F16K 5/0668 | 137/614.01 |
| 5,741,006 A * | 4/1998 | Murai | F16K 1/2265 | 251/305 |
| 7,114,486 B2 * | 10/2006 | Hannewald | F02D 9/1025 | 251/305 |
| 7,165,513 B2 * | 1/2007 | Humburg | B60H 1/00978 | 165/41 |
| 7,651,071 B1 * | 1/2010 | Tanner | F16K 25/00 | 251/177 |
| 8,276,880 B2 * | 10/2012 | Kolb | F16K 1/2261 | 251/306 |
| 9,932,882 B2 * | 4/2018 | Imasaka | F01P 7/14 | |
| 10,190,695 B2 * | 1/2019 | Grompe et al. | F16K 15/14 | |
| 10,473,064 B2 * | 11/2019 | Barata Mendes Moreira | F16K 1/2261 | |
| 11,359,538 B2 * | 6/2022 | Sharp | F02B 37/18 | |
| 11,378,191 B2 * | 7/2022 | Wang | F16K 11/085 | |
| 11,560,952 B2 * | 1/2023 | Graichen | F16K 5/18 | |
| 2015/0345644 A1 * | 12/2015 | Dominguez | F02M 26/70 | 251/308 |
| 2015/0361865 A1 * | 12/2015 | Lee | F02M 26/28 | 123/41.08 |
| 2017/0363220 A1 * | 12/2017 | Yan | F16K 11/085 | |
| 2018/0292016 A1 * | 10/2018 | Ledvora | F16K 5/0471 | |
| 2018/0335149 A1 * | 11/2018 | Trudel | F16K 1/2268 | |
| 2018/0372235 A1 * | 12/2018 | Smith | F16K 27/065 | |
| 2023/0265929 A1 * | 8/2023 | Jost | F16K 3/246 | 251/333 |
| 2023/0332691 A1 * | 10/2023 | An | F16K 1/2263 | |

* cited by examiner

TOP-LOADED ROTARY VALVE WITH ELLIPTICAL SEALING

CROSS-REFERENCE TO RELATED APPLICATIONS

The application is a continuation of U.S. patent application Ser. No. 18/159,866, filed Jan. 26, 2023, which claims priority from U.S. Provisional Patent Application No. 63/308,113 filed on Feb. 9, 2022, both entitled "Top-loaded Rotary Valve with Elliptical Sealing," the contents of which is hereby incorporated by reference.

BACKGROUND OF THE INVENTION

Water metering systems are being developed that include features to automatically shut off or control flow to metered premises. Rotary valves can be used to implement such flow controls. When used with water meters, the rotary valves need to meet service parameters that correspond to overall meter requirements for reliability, service life, power consumption, replacement, and the like. For example, valves may be integrated with a battery-powered water meter that has a required service life (e.g., a 3-years, 5-years, etc.). Accordingly, a valve that provides ease of assembly, dependable actuation, and minimal power use (e.g., small range of motion, low required torque, etc.) are advantageous for this application.

Existing types of rotary valves for water service typically include ball valves, plug valves, and butterfly valves. Each type of valve is capable of providing open-to-close actuation with one-quarter turn. For inclusion in a combination "meter-plus-valve" application, it is further desirable that such valves are top-loaded; i.e., the working elements should be loaded on an axis perpendicular to the axis of water flow. Present technology ball valves and butterfly valves are end-loaded, creating assembly issues. While some top-loaded plug valves are available, these valves typically exhibit high actuation torques. The high torques required for these plug valves makes them unsuitable for battery operated meters.

DETAILED DESCRIPTION OF THE PREFERRED EMBODIMENTS

The following detailed description refers to the accompanying drawings. The same reference numbers in different drawings identify the same or similar elements. Also, the following detailed description does not limit the invention.

According to implementations described herein, a top-loaded rotary valve is provided with an elliptical seal. A cylindrical top-loaded cartridge of the rotary valve is configured for insertion into a cylindrical outer casing. A single elliptical gasket separates an upper portion and a lower portion of the cartridge housing and provides multiple sealing functions for the valve. A rotor disc prevents flow when the disc is fully engages with the gasket and rotates with relatively low actuation torque to open the valve.

Figure 1:
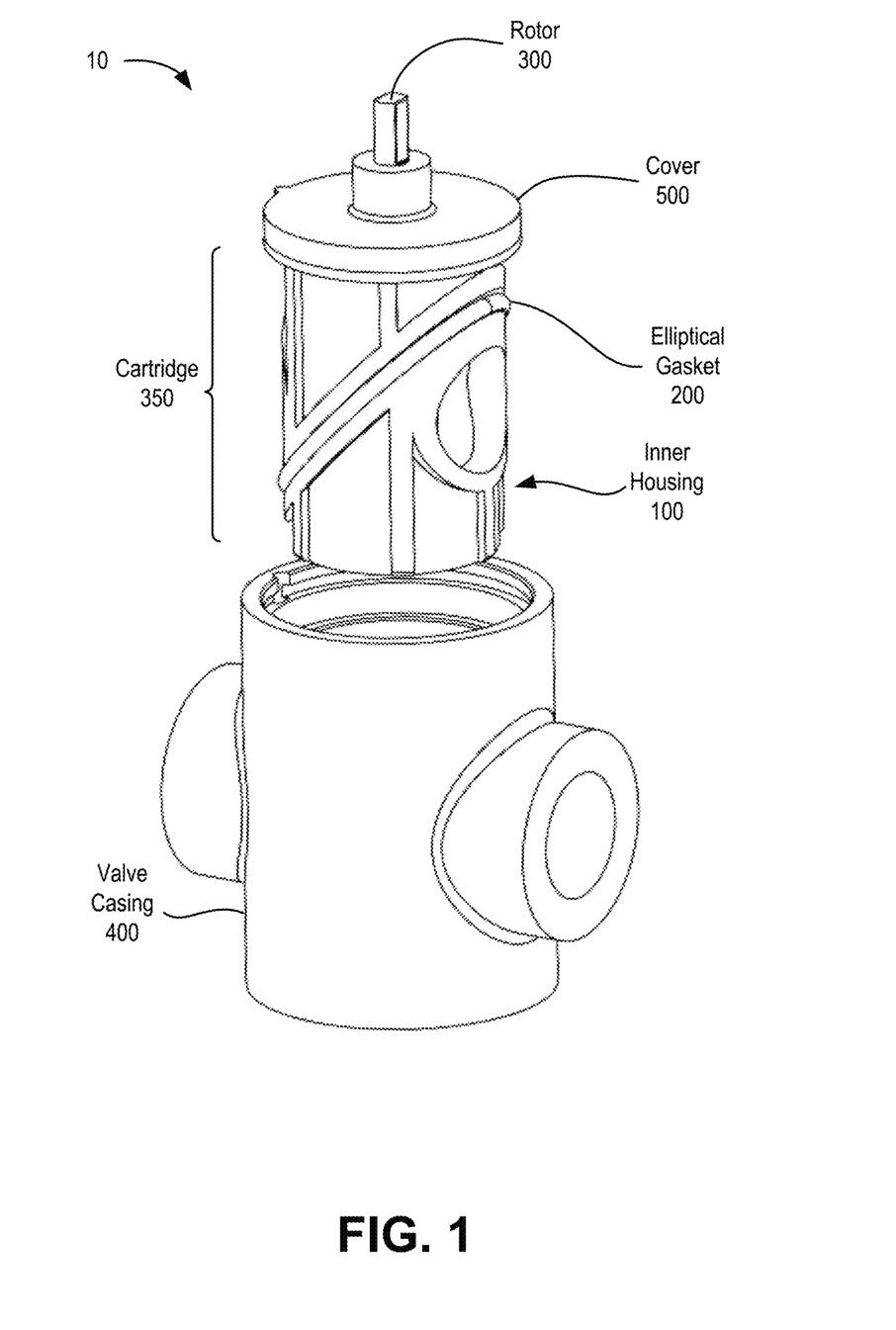
FIG. 1 is an installation view of a top-loaded rotary valve according to an embodiment described herein.

Referring to FIG. 1, a top-loaded rotary valve 10 may include an inner housing 100 including an elliptical gasket 200, a rotor 300, a valve casing 400, and a cover 500. The combination of inner housing 100, elliptical gasket 200, and rotor 300 may also be collectively referred to herein as a cartridge 350.

Figure 12:
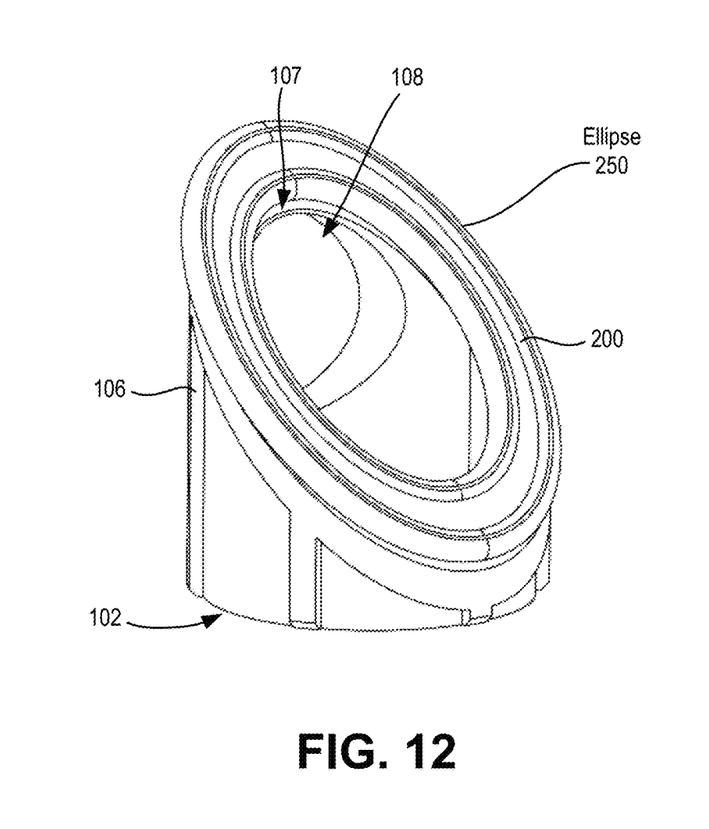
FIG. 12 is a perspective view of the lower portion of the housing and elliptical gasket of FIG. 9.
Figure 13:
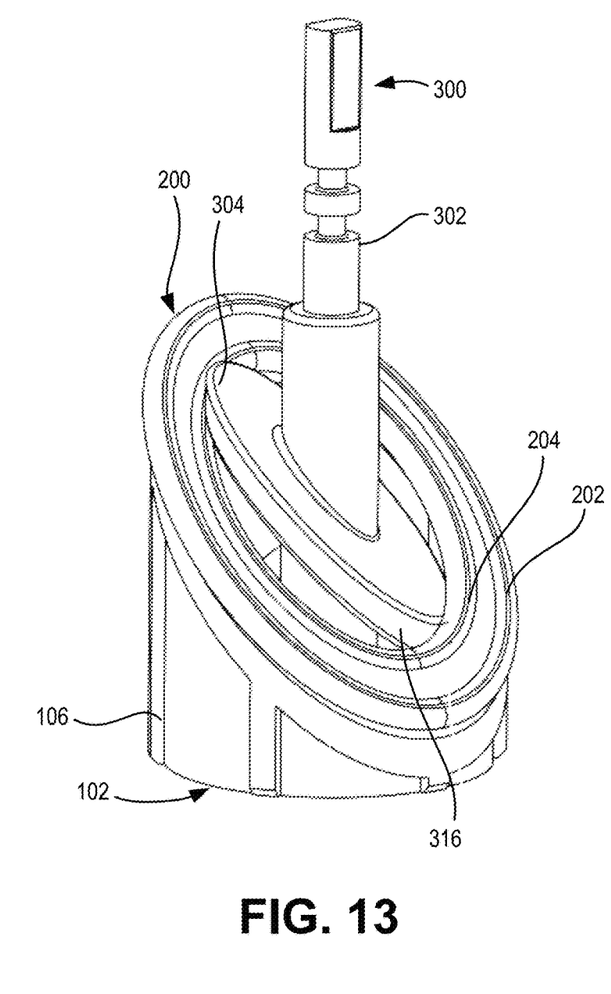
FIG. 13 is a perspective view of the lower portion of the housing and elliptical gasket of FIG. 9 with the rotor installed in a partially open position.

Inner housing 100 may include a generally cylindrical structure configured to be received in valve casing 400. Referring collectively to the various depictions in FIGS. 1-13, housing 100 may include a lower cylinder portion 102 and an upper cylinder portion 122, which are separated along an angled plane by a gasket 200. The intersection of this angled plane and the cylinders 102/122 defines an ellipse 250 (e.g., FIG. 12). Ellipse 250 is fixed and oriented such that the major-axis of the ellipse and the flow axis are in the same vertical plane (e.g., the vertical plane A-A of FIG. 2 that forms the cross-section of FIG. 3). The ellipse represents the fixed sealing surface where gasket 200 may be installed.

Figure 3:
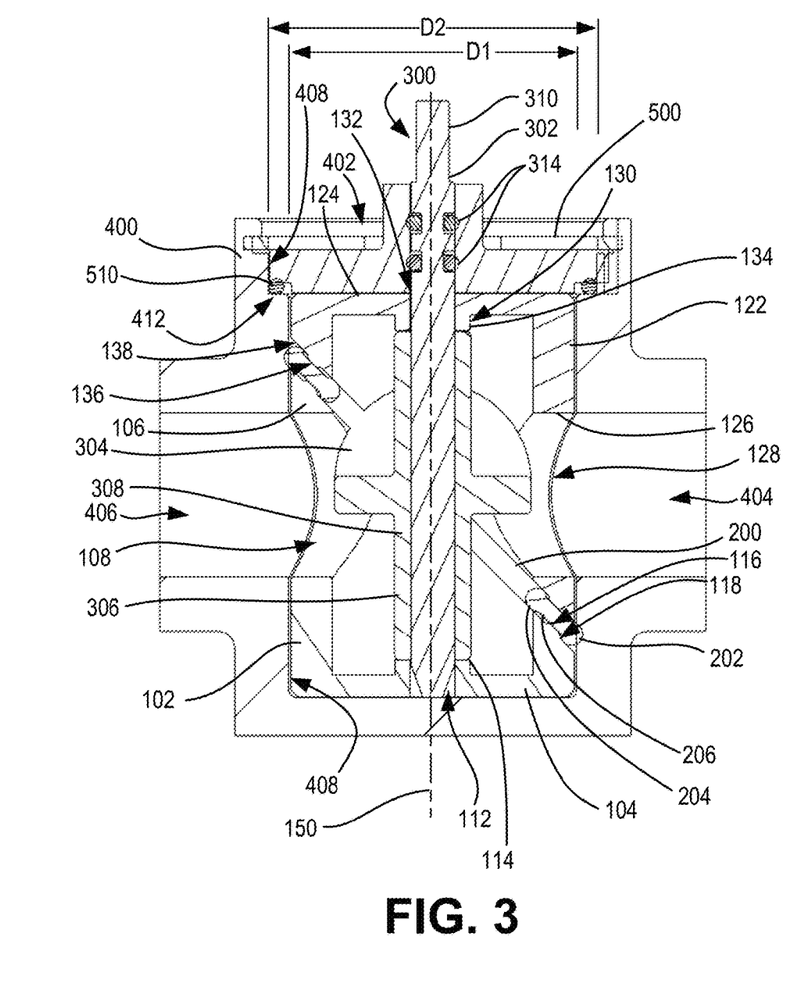
FIG. 3 is a cross-sectional view of the top-loaded rotary valve of FIG. 2.
Figure 4:
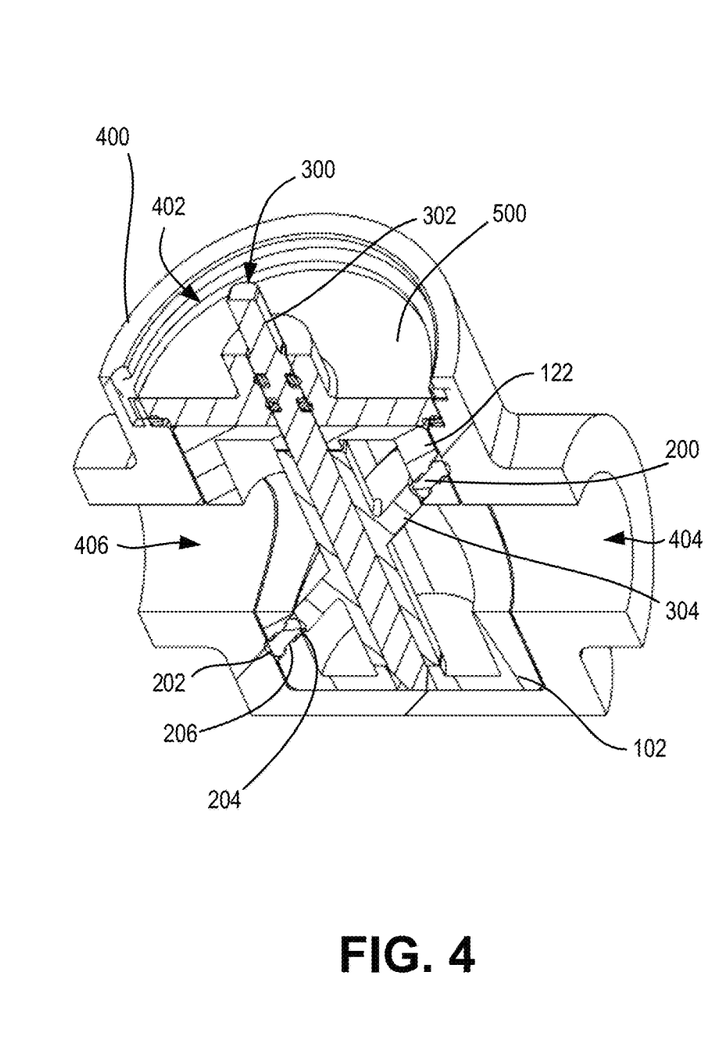
FIG. 4 is a cross-sectional diagram illustrating the top-loaded rotary valve in a closed position.
Figure 5:
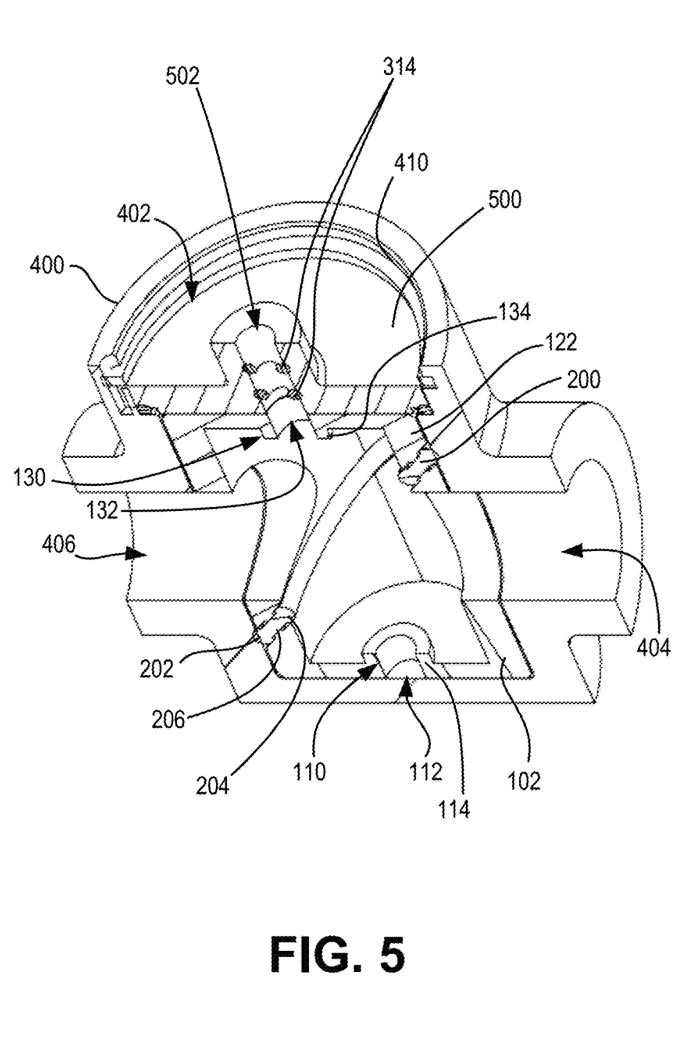
FIG. 5 is a cross-sectional diagram illustrating the top-loaded rotary valve without a rotor installed.
Figure 9:
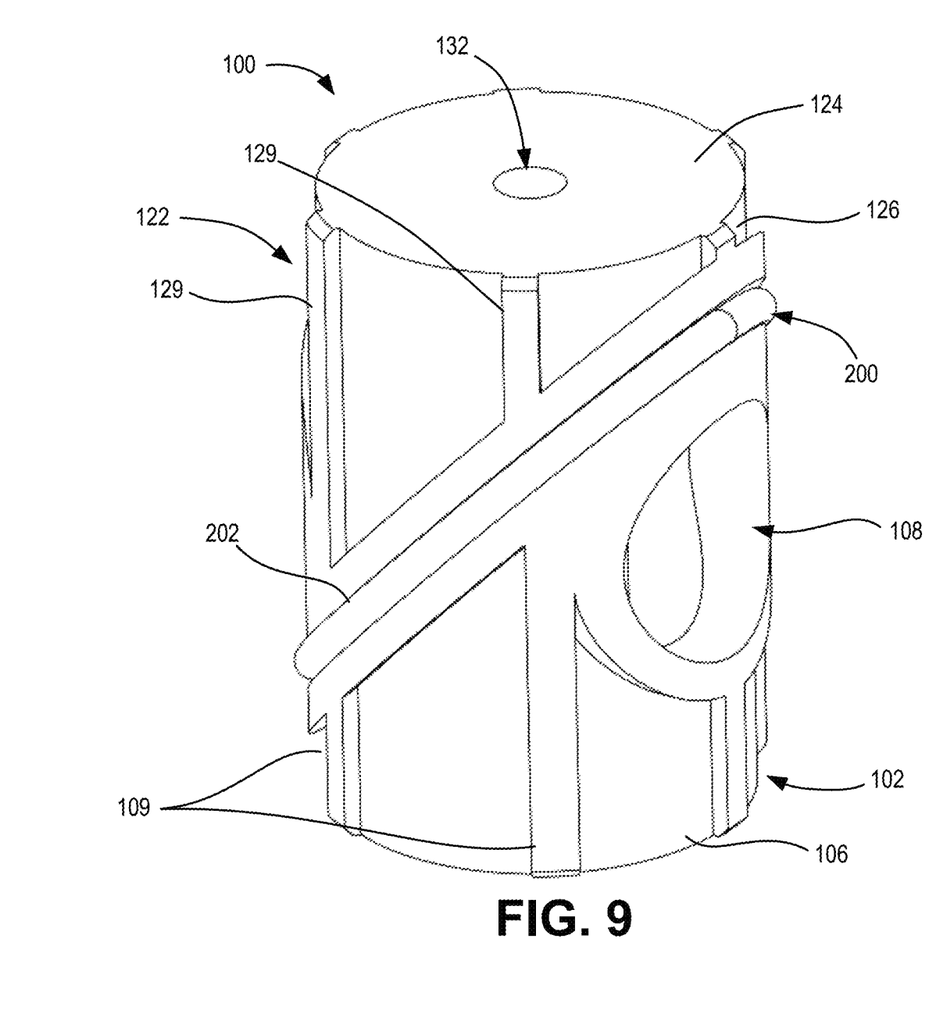
FIGS. 9-11 are perspective, side, and front views, respectively, of a housing for the top-loaded rotary valve, according to an embodiment.
Figure 10:
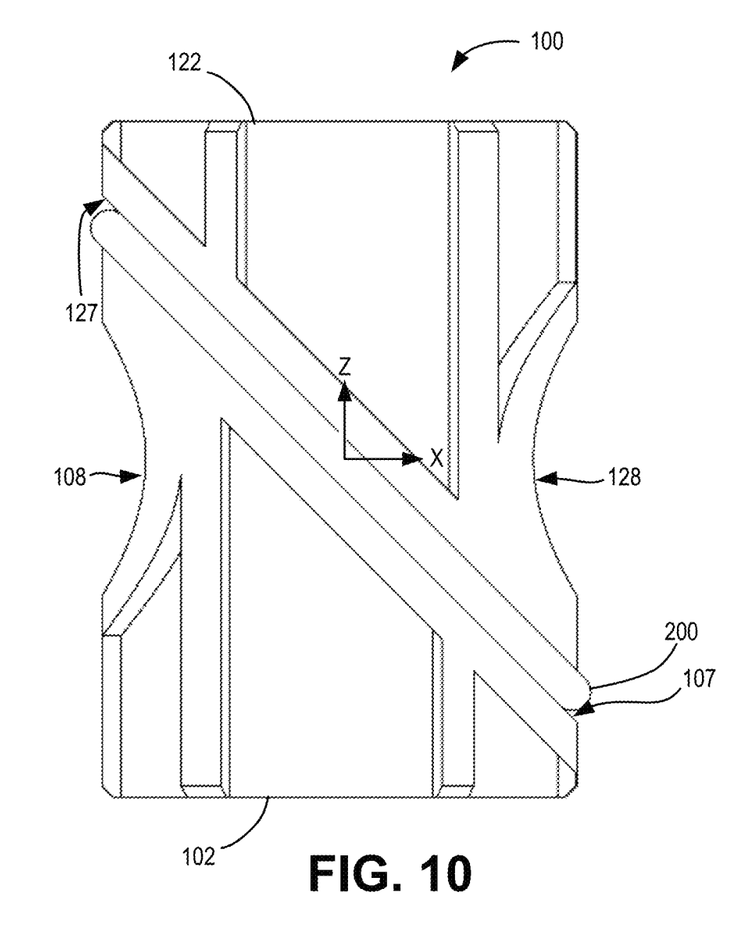
Figure 11:
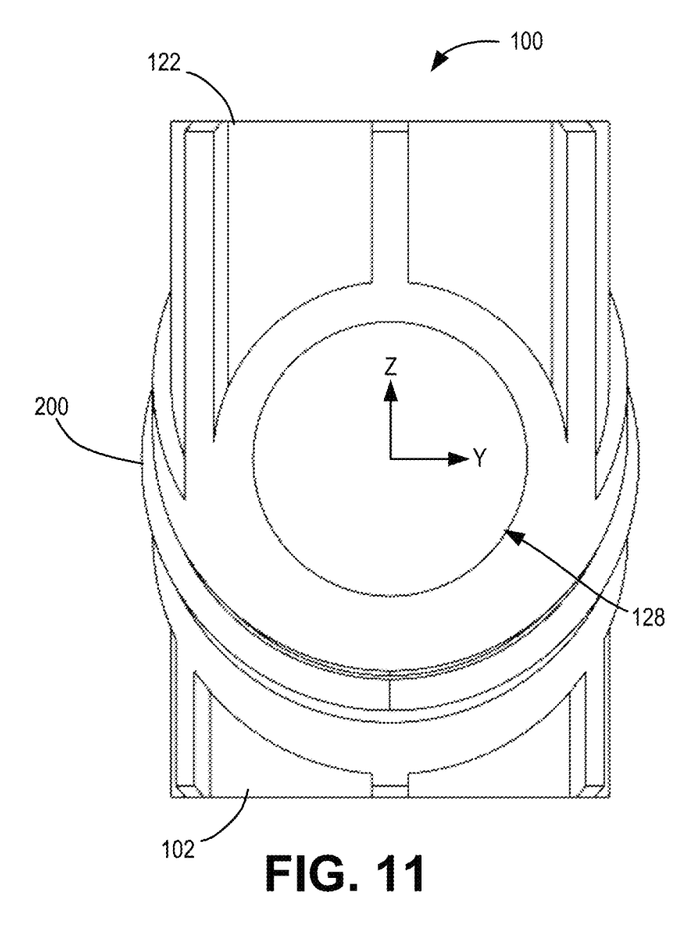

As shown in FIGS. 3-5, lower cylinder portion 102 may include a circular base 104, a ribbed cylindrical wall 106 with an open end 107, and a first flow opening 108. Circular base 104 may include a rotor mount 110 centered on the axis (e.g., corresponding to the "z" axis shown in the figures) of lower cylinder portion 102. Rotor mount 110 may include a hole 112 and a support flange 114 around hole 112. As shown in FIG. 9, ribbed cylindrical wall 106 includes a plurality of spaced axial ribs 109 projecting radially from an outside surface thereof. Ribbed cylinder wall 106 may have an outer diameter, along the ribs, that fits within the inside diameter of valve casing 400. Flow opening 108 may form a generally circular opening through cylindrical wall 106, such that an axis of opening 108 (e.g., corresponding to the "x" axis shown in the figures) is orthogonal to the axis of lower cylinder portion 102 (e.g., corresponding to the "z" axis shown in the figures). At the open end of lower cylinder portion 102, the top of ribbed cylindrical wall 106 includes a contact surface 116, as shown in FIG. 3. Contact surface 116 may include a raised gasket ring portion 118. Raised gasket ring portion 118 may provide a seating surface upon which to position/align elliptical gasket 200.

According to one implementation, lower cylinder portion 102 and upper cylinder portion 122 may be formed as identical parts, with lower cylinder portion 102 and upper cylinder portion 122 installed in opposite orientations to form inner housing 100. Accordingly, upper cylinder portion 122 may include a circular base 124, a ribbed cylindrical wall 126 with an open end 127, and a first flow opening 128. Circular base 124 may include a rotor mount 130 centered on the axis (e.g., corresponding to the "z" axis shown in the figures) of lower cylinder portion 122. Rotor mount 130 may include a hole 132 and a support flange 134 around hole 132. Ribbed cylindrical wall 126 may include a plurality of spaced ribs 129 and may have an outer diameter, along the ribs, that fits within the inside diameter of valve casing 400. Flow opening 128 may form a generally circular opening through cylindrical wall 126, such that an axis of opening 128 (e.g., corresponding to the "x" axis shown in the figures) is orthogonal to the axis of upper cylinder portion 122 (e.g., corresponding to the "z" axis shown in the figures). At the open end of upper cylinder portion 122, the bottom (when installed) of ribbed cylindrical wall 126 includes a contact surface 136, as shown in FIG. 3. Contact surface 136 may include a raised gasket ring portion 138. Raised gasket ring portion 138 may provide a seating surface upon which to align elliptical gasket 200.

According to an implementation, lower cylinder portion 102 and upper cylinder portion 122 may be formed of a molded plastic material. For example, lower cylinder portion 102 and upper cylinder portion 122 may be formed from an engineered polymer (a reinforced engineering thermoplastic, such as Polyphenylene Ether (PPE) or Polyphenylene Oxide (PPO).

Elliptical gasket 200 may include a continuous elliptical body or gasket that includes an outer bead 202 and an inner bead 204 separated by a band 206. As shown, for example, in FIG. 3, elliptical gasket 200 may be installed at the interface between lower cylinder portion 102 and upper cylinder portion 122. Generally, the dimensions of elliptical gasket 200 may be configured to match the perimeter of the elliptical shape of contact surfaces 118/138. More particularly, dimensions of band 206 may be configured fit onto gasket ring portions 118/138 with outer bead 202 and an inner bead 204 exposed on either side of gasket ring portion 118/138. Thus, elliptical gasket 200 provides a resilient compressible material at the interface between lower cylinder portion 102 and upper cylinder portion 122.

Elliptical gasket 200 can be constructed of any suitably durable and elastomeric material, such as silicone, butyl rubber polyamide, polyester, olefin, styrenics, urethane, and a composite of a thermoplastic and cured rubber. More specific examples include room temperature vulcanization silicone, uncured ethylene-propylene-diene-monomer (EPDM) blended with polypropylene, styrene-butadiene-styrene block polymer, styrene-ethylene-butylene-styrene block polymer, cured ethylene-propylene-diene copolymer/polypropylene blend, cured isobutylene isoprene rubber/polypropylene blend, and cured nitrile butadiene rubber/polyvinylchloride blend.

Figure 6:
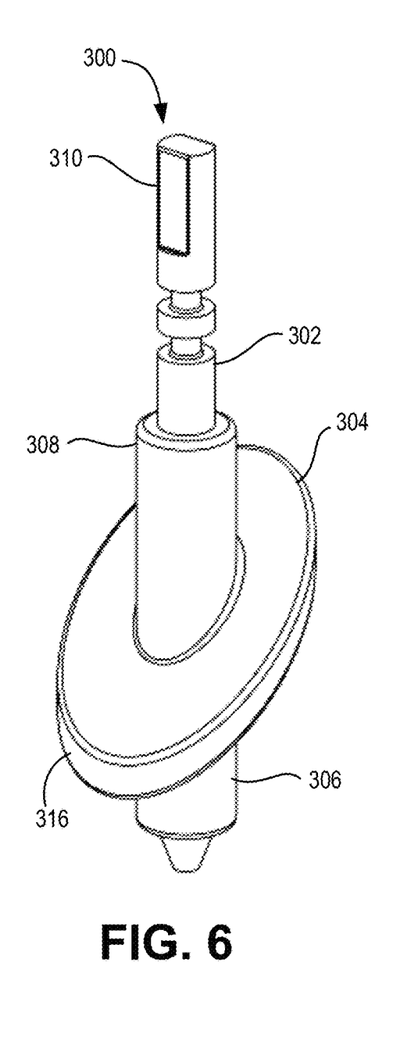
FIGS. 6-8 are perspective, side, and front views, respectively, of a rotor for the top-loaded rotary valve, according to an embodiment.
Figure 7:
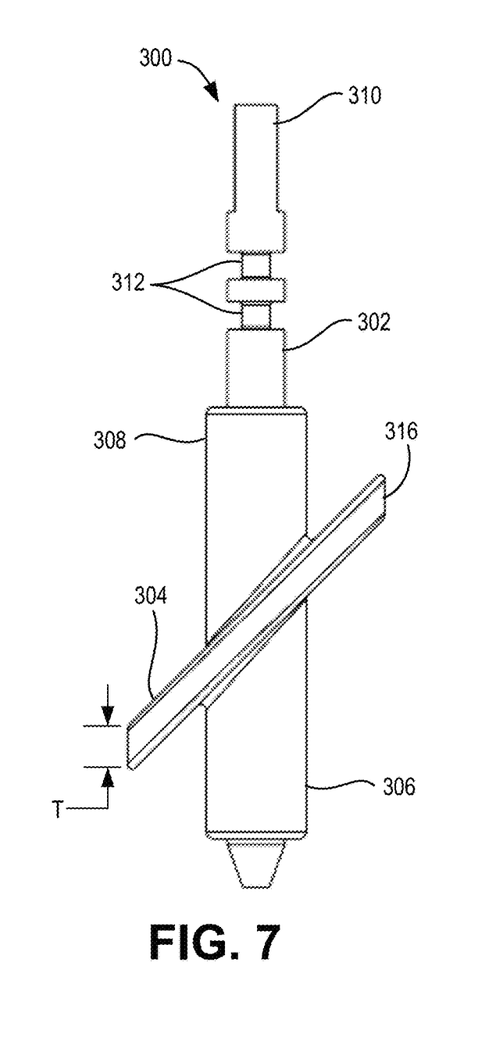
Figure 8:
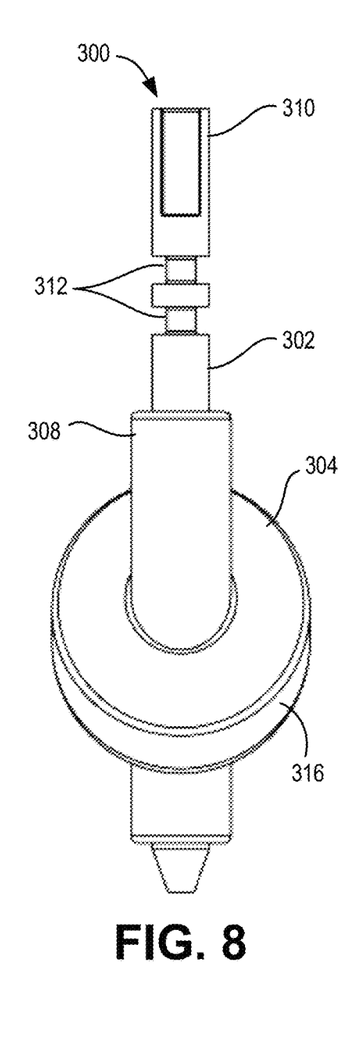

As shown in FIGS. 6-8, rotor 300 may include a stem 302, a disc 304, a lower shoulder 306, and an upper shoulder 308. Stem 302 may be a generally be a solid cylinder sized to fit into or through holes 112 and 132. In one implementation, stem 302 may be a metal material, such as steel. In another implementation, stem 302 may be formed from manmade polymer material. Disc 304 may be fixedly mounted to stem 302. According to an implementation, disc 304, with shoulders 306 and 308, may be a plastic material that is molded over stem 302.

As shown, for example, in FIG. 6, disc 304 may be in the form of a matching ellipse to gasket 200 (e.g., corresponding to the interior of fixed ellipse 250 formed where gasket 200 is seated between lower cylinder portion 102 and upper cylinder portion 122). In other words, the elliptical perimeter of disc 304 may be geometrically similar to fixed ellipse 250. Disc 304 may have a thickness, T, at a peripheral surface 316 of disc 304 configured to contact gasket 200. According to an implementation, peripheral surface 316 may be parallel to the common vertical axis of stem 302, lower cylinder portion 102, and upper cylinder portion 122 (e.g., the z-axis of the figures).

Rotor 300 may be enclosed within lower cylinder portion 102 and upper cylinder portion 122. More particularly, stem 302 may be inserted into hole 112 of rotor mounts 110 and hole 132 of rotor mount 130 to hold stem 302 in a vertical orientation (e.g., along the z-axis of the figures). Stem 302 may be configured to rotate within rotor mounts 110 and 130 about an actuation axis 150 that is coincident with the axis of cylindrical inner housing 100 (e.g., the z-axis of the figures). For example, rotation of stem 302 relative to inner housing 100 and valve casing 400 may be performed by a suitable battery-operated valve control mechanism, not shown.

Lower cylinder portion 102 and an upper cylinder portion 122 may be installed over rotor 300 and joined along an angled plane, with elliptical gasket 200 secured between contact surfaces 116 and 136. Lower cylinder portion 102 and an upper cylinder portion 122 may be aligned such that flow openings 108 and 128 may share a common flow axis (e.g., corresponding to the "x" axis shown in the figures).

Lower shoulder 306 of rotor 300 may be configured to abut support flange 114 to provide desired vertical orientation of disc 304 relative to elliptical gasket 200. Upper shoulder 308 may be configured to abut support flange 134 to maintain desired vertical orientation of disc 304 relative to elliptical gasket 200.

Rotor 300 may further include an actuation tip 310 at an end (e.g., an upper end) of stem 302. Actuation tip may extend beyond upper cylinder portion 122 and cover 500 to expose to stem 302 to application of external forces. For example, actuation tip 310 may include a one or more contact surfaces to which an actuator or another device can apply rotational forces to rotor 300. According to one embodiment, rotor 300 may rotate one quarter turn (i.e., 90 degrees) between a fully open position (e.g., FIGS. 2 and 3) and a fully closed position (e.g., FIG. 4). When installed within housing 100, elliptical disc 304 may be oriented to be on the same plane as elliptical gasket 200 when rotor 300 in in the closed position.

Stem 302 may also include one or more grooves 312, each configured to receive an O-ring seal 314 therein. As described further herein, O-ring seal 314 may be configured to form a fluid-tight seal between stem 302 and cover 500.

Valve casing 400 may be configured to connect to a piping system and may include a structure to receive cartridge 350 therein. In some implementations, cartridge 350 (including housing 100, elliptical gasket 200, and rotor 300) may be provided as a replaceable component for top-loaded rotary valve 10, such that cartridge 350 may be configured to fit within a valve casing 400 that has been previously connected to supply piping. In other implementations, top-loaded rotary valve 10 may be installed by connecting valve casing 400 to supply piping.

Casing 400 may include an internal bore 402 (e.g., a cylindrical volume) configured to receive cartridge 350 through a top opening. Valve casing 400 may include an inlet 404 and an outlet 406. Inlet 404 may be configured to align with opening 108 and outlet 406 may be configured to align with opening 128, such that inlet 404, flow opening 108, flow opening 128, and outlet 406 may share a common flow axis (e.g., along the X-axis of the figures). In another implementation, inlet 404, flow opening 108, flow opening 128, and outlet 406 may have parallel flow axes. Valve casing 400 may be generally configured, along with cover 500, to enclose housing 100 without limiting access to flow opening 108 and flow opening 128. In one implementation, the internal bore 402 may include one or more indexing tabs (not shown) to ensure correct orientation of cartridge 350 relative to casing 400 and to prevent rotation of cartridge 350 relative to casing 400. According to an implementation, valve casing 400 may include connectors (not shown) to direct fluid into inlet 404 and out from flow outlet 406.

An interior surface 408 of internal bore 402 may have an interior diameter D1 that is nominally larger than the outer diameter of ribbed cylindrical walls 106 and 126, such that cartridge 350 fits snugly within the inside diameter of valve casing 400. Internal bore 402 may have another interior surface 410 with an upper interior diameter D2 that is larger than the diameter D1. Interior surface 410 may be sized to receive cover 500 therein. A shoulder 412 may be formed at the interface of interior surface 408 and interior surface 410. According to an implementation, valve casing 400 may be made from a metal material, such as a casted metal (e.g., bronze) with machined bore to form interior surface 408 and interior surface 410.

Cover 500 may include a substantially disc-shaped structure with an access hole 502. According to one implementation, cover 500 may be formed from a metal material, such as bronze. In other implementations, cover 500 may be formed from a plastic material. Access hole 502 may be configured to receive stem 302 therethrough. Cover 500 may be installed through the opening of internal bore 402 of valve casing 400 to secure cartridge 350 within valve casing 400. For example, in one implementation, cover 500 may include threads on an outer diameter that correspond to threads on interior surface 410, such that cover 500 may be screwed into valve casing 400. An O-ring seal 510 may be interposed between cover 500 and shoulder 412 to form a fluid-tight interface therebetween.

When cover 500 is installed onto valve casing 400, access hole 502, hole 112, hole 132, and stem 302 may share a common axis with actuating axis 150 (e.g., along the Z-axis of the figures). A portion of stem 302 may extend through access hole 502, such that grooves 312 and o-rings 314 align with the interior surface of cover 500 within access hole 502 to form a fluid-tight interface. Thus, the interface between valve casing 400 and cover 500 may be a fluid-tight interface.

When cartridge 350 is installed in valve casing 400, outer bead 202 of gasket 200 may be compressed against the interior surface 408 of valve casing 400 to form a fluid-tight seal along the fixed ellipse 250. Gasket 200 thus forms a first fluid-tight seal between interior surface 408 and lower cylinder portion 102 and forms a second fluid-tight seal between interior surface 408 and upper cylinder portion 122.

Inside housing 100, inner bead 204 of gasket 200 may be exposed to disc 304. While inner bead 204 of gasket 200 and peripheral surface 316 of disc 304 are coincident (e.g., rotor 300 is turned to a closed position), such as shown in FIG. 4, a water-tight seal exists between elliptical gasket 200 and disc 304. As rotor 300 turns about actuation axis 150, the contact between the fixed ellipse and the rotor ellipse is broken, and water is allowed to flow around the periphery of disc 304.

Figure 2:
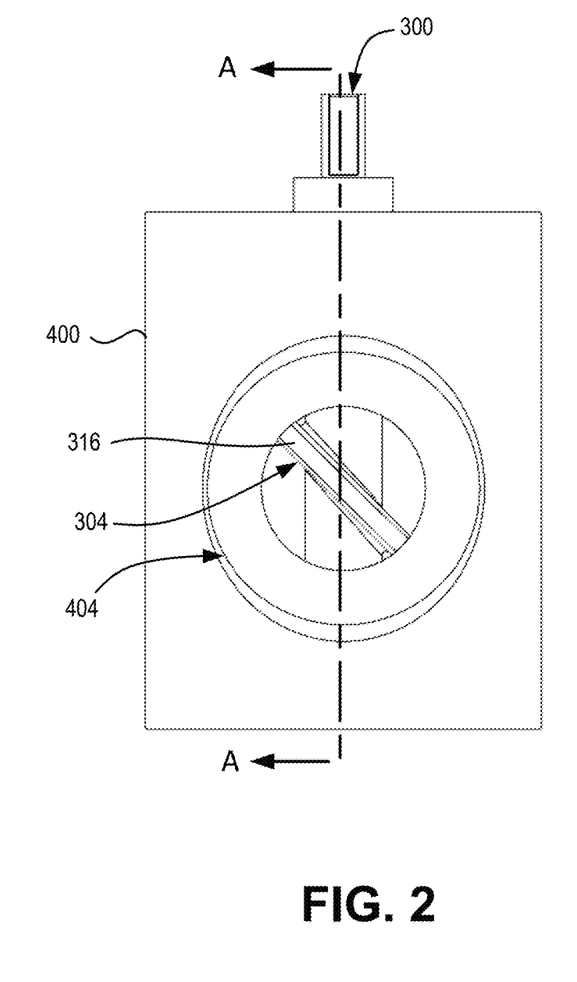
FIG. 2 is a side view of the top-loaded rotary valve configured in an open position.

As shown in FIGS. 2 and 3, the opening for flow between flow opening 108 and flow opening 128 reaches a maximum size when rotor 300 has made one-quarter of a turn. As shown, for example, in FIG. 13, as the rotor is made to turn about actuation axis 150, peripheral surface 316 of disc 304 contacts inner bead 204 of gasket 200 at only two points; these contact points advance along the peripheral surface 316 and gasket 200, effectively "wiping" the sealing interface (e.g., inner bead 204 of gasket 200) clean of debris.

Compared to ball valves and butterfly valves, top-loaded rotary valve 10 described herein allows straightforward development into a top-loaded cartridge. Also, compared to ball valves, the diameter of the top-loaded rotary valve 10 can be made on the order of the pipe diameter, depending upon the angle of the plane intersection. The top-loaded rotary valve 10 requires only a single main seal (e.g., elliptical gasket 200) used to seal against the rotor (e.g., disc 304) and the valve casing (e.g., surface 408 of casing 400), compared to the multiple seals required for a ball-valve.

A top-loaded rotary valve with elliptical sealing is described herein. The valve includes a valve cartridge with a lower cylinder portion having a first flow opening, an upper cylinder portion having a second flow opening, a rotor, and a gasket positioned between respective ends of the lower cylinder portion and the upper cylinder portion. The rotor includes a stem and a disc configured to rotate within the cartridge. The lower cylinder portion and the upper cylinder portion are mated to the gasket along a plane that defines an ellipse along the respective cylinder ends. The disc has perimeter that is similar (e.g., geometrically similar) to the ellipse, and the rotor rotates between a closed position in which the elliptical perimeter of the disc is coincident with the gasket to prevent flow between the flow openings and an open position that permits flow between the flow openings.

According to one implementation, the first flow opening and the second flow opening are aligned along a flow axis, and a major axis of the ellipse is in a vertical plane that includes the flow axis. According to another implementation, the lower cylinder portion and the upper cylinder portion are identical parts (e.g., where the angle of the major axis of ellipse 250 is 45 degrees above/below the flow (or X) axis). In another implementations, the angle of the major axis of ellipse 250 may be oriented at a different angle, such that the lower cylinder portion and the upper cylinder portion have different (e.g., supplementary) angles.

The valve cartridge is configured to be inserted into a valve casing that has an internal bore, an inlet, and an outlet. The axis of the internal bore is orthogonal to the axis of the inlet and the axis of the outlet. The axis of the inlet, the axis of the outlet, the axis of the flow openings are common (or at least parallel) when the valve cartridge is installed in the internal bore. The gasket forms a fluid-tight seal between the internal bore and the lower cylinder portion, and also forms a fluid-tight seal between the internal bore and the upper cylinder portion.

A cover is installed into a top opening of the valve casing to secure the valve cartridge within the internal bore. The cover includes an access hole that is axially aligned with rotor mounts of the lower cylinder portion and upper cylinder portion. The stem extends through access hole to permit application of rotational force to the rotor. According to an implementation, rotation of the rotor causes the disc perimeter to contact the gasket at two points that change as the rotor continues to rotate, effectively wiping the sealing surface of the gasket.

The foregoing description of implementations provides illustration and description, but is not intended to be exhaustive or to limit the invention to the precise form disclosed. Modifications and variations are possible in light of the above teachings or may be acquired from practice of the invention.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A valve system, comprising;
    a valve cartridge, the valve cartridge including:
        a lower cylinder portion that includes a first open end, a first base, and a first flow opening;
        an upper cylinder portion that includes a second open end, a second base, and a second flow opening, wherein the lower cylinder portion and the upper cylinder portion are joined along the first open end and the second open end such that an axis of the lower cylinder portion and an axis of the upper cylinder portion are aligned on a common cylinder axis and the first flow opening and the second flow opening are aligned along a common flow axis; and
        a disc mounted for rotation about the common cylinder axis within the valve cartridge, wherein the disc has an elliptical perimeter, and
    wherein the disc rotates between an open position that permits flow between the first flow opening and the second flow opening and a closed position that prevents flow between the first flow opening and the second flow opening.

2. The valve system of claim 1, wherein the valve cartridge further comprises:
    a stem, between the lower cylinder portion and the upper cylinder portion, secured for rotation about the common cylinder axis, wherein the disc is mounted on the stem.

3. The valve system of claim 1, wherein the valve cartridge further comprises:
    an elliptical gasket secured between the first open end and the second open end.

4. The valve system of claim 3, further comprising:
    a valve casing comprising an internal bore, an inlet, and an outlet,
    wherein the internal bore is configured to receive the valve cartridge therein and prevent rotation of the lower cylinder portion and the upper cylinder portion relative to the valve casing.

5. The valve system of claim 4, wherein the inlet, the outlet, the first flow opening, and the second flow opening are aligned along the common flow axis.

6. The valve system of claim 4, wherein the elliptical gasket forms a first fluid-tight seal between the internal bore and the lower cylinder portion and forms a second fluid-tight seal between the internal bore and the upper cylinder portion.

7. The valve system of claim 6, further comprising:
    a cover configured to be installed into a top opening of the valve casing to secure the valve cartridge within the internal bore.

8. The valve system of claim 3, wherein the elliptical perimeter of the disc and a perimeter of the elliptical gasket are geometrically similar.

9. The valve system of claim 1, wherein the disc, when mounted for rotation, includes a peripheral surface that is parallel to the common cylinder axis.

10. The valve system of claim 1, wherein the lower cylinder portion and the upper cylinder portion are identical parts.

11. A valve cartridge comprising:
    a housing including:
        a lower cylinder portion that includes a first open end, a first base, and a first flow opening, and
        an upper cylinder portion that includes a second open end, a second base, and a second flow opening, wherein the lower cylinder portion and the upper cylinder portion are joined along the first open end and the second open end such that an axis of the lower cylinder portion and an axis of the upper cylinder portion are aligned on a common cylinder axis and the first flow opening and the second flow opening are aligned along a common flow axis; and a disc mounted for rotation about the common cylinder axis within the housing, wherein the disc has an elliptical perimeter, and wherein the disc rotates between an open position that permits flow between the first flow opening and the second flow opening and a closed position that prevents flow between the first flow opening and the second flow opening.

12. The valve cartridge of claim 11, further comprising:
a stem, between the lower cylinder portion and the upper cylinder portion, secured for rotation about the common cylinder axis, wherein the disc is mounted on the stem.

13. The valve cartridge of claim 11, further comprising:
an elliptical gasket secured between the first open end and the second open end.

14. The valve cartridge of claim 13, wherein rotation of the disc causes the elliptical perimeter of the disc to contact the elliptical gasket at two points that change as the disc continues to rotate.

15. The valve cartridge of claim 11, wherein the disc, when mounted for rotation, includes a peripheral surface that is parallel to the common cylinder axis.

16. The valve cartridge of claim 11, wherein the first open end and the second open end are joined along an ellipse, with a major axis of the ellipse having a 45-degree angle with respect to the common flow axis.

\* \* \* \* \*